J. H. DANVER.
BATH TUB LEG.
APPLICATION FILED FEB. 16, 1914.
1,285,062.
Patented Nov. 19, 1918.
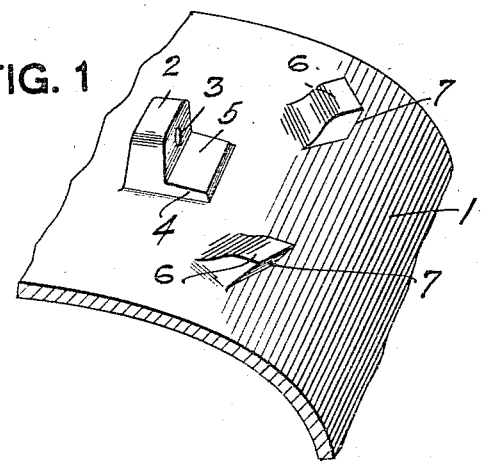
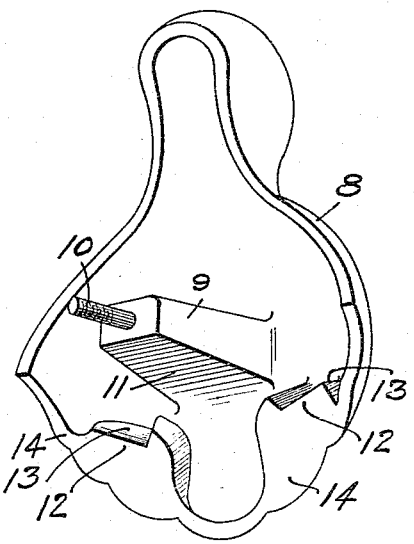
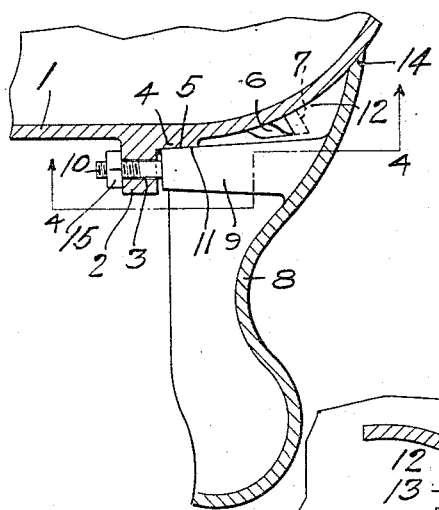
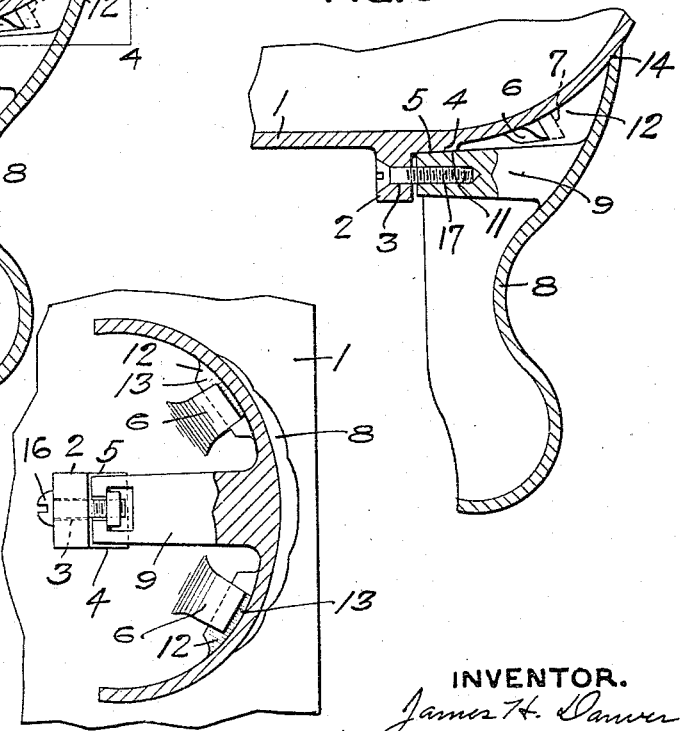
WITNESSES.
J. R. Keller
John F. Will
INVENTOR.
James H. Danver

UNITED STATES PATENT OFFICE.

JAMES H. DANVER, OF ZELIENOPLE, PENNSYLVANIA, ASSIGNOR TO IRON CITY SANITARY MANUFACTURING COMPANY, OF PITTSBURGH, PENNSYLVANIA, A CORPORATION OF PENNSYLVANIA.

BATH-TUB LEG.

1,285,062.

Specification of Letters Patent.

Patented Nov. 19, 1918.

Application filed February 16, 1914. Serial No. 818,961.

*To all whom it may concern:*

Be it known that I, JAMES H. DANVER, a citizen of the United States, and resident of Zelienople, in the county of Butler and State of Pennsylvania, have invented a new and useful Improvement in Bath-Tub Legs; and I do hereby declare the following to be a full, clear, and exact description thereof.

My invention relates primarily to improved means for attaching bath tub legs to the body of the tub, although it is to be understood that the invention is not limited to use with bath tubs, but may be applied to other uses, for example, such as the attachment of stove legs.

The object of the invention is to so arrange the attaching means and guiding holding surfaces, both on the leg and on the body of the tub, that by the mere operation of tightening up the attaching means, such as a bolt or screw, the leg will be securely positioned on the tub, and will be drawn into snug engagement with the curvature of the tub.

A further object is to so arrange the guiding and clamping members relatively, that the greatest possible area of the clamping and holding surfaces thereof will be in contacting engagement when the leg is finally positioned upon or attached to the tub. It is also the purpose of the invention to so arrange attaching and guiding lugs or faces, both on the leg and the body of the tub, that the leg will necessarily be drawn to the proper supporting point of the tub body by the mere tightening up of the fastening screw or bolt.

Preferred embodiments of the invention are illustrated in the accompanying drawings, in which Figure 1 is a fragmentary view of a portion of the body of the tub, showing the attaching and guiding lugs thereon. Fig. 2 is a perspective view of the interior of a hollow cast leg, showing complemental or coöperating fastening members. Fig. 3 is a fragmentary vertical sectional view through the leg and tub body, showing the leg secured in supporting position. Fig. 4 is a sectional view on the line 4—4, Fig. 3, but showing a modified form of attaching bolt and Fig. 5 is a view similar to Fig. 3, showing a further modification of attaching screw.

Referring to Fig. 1, 1 indicates a portion of the tub body, which is provided with a main attaching lug or projection 2, apertured at 3 to receive the attaching bolt or screw for securing the leg in position. Adjacent the lug 2 is a supporting face or raised portion 4, whose surface 5 is inclined upwardly slightly from the lug 2 as indicated at Figs. 3 and 5. Adjacent the main securing lug 2 are auxiliary clamping and securing lugs 6—6, having securing faces 7 respectively. These lugs 6 are spaced away at equal distances to either side of the main lug 2 toward the outer side of the tub, and the faces 7 thereof are arranged on diverging lines which would meet on a line drawn through the center lug 2 and at right angles to the side wall of the tub. The hollow leg 8 is provided with a securing and supporting arm 9 which in the form shown in Fig. 2, has secured in the end thereof, a threaded fastening bolt 10, adapted to pass through the aperture 3 of the main fastening lug 2. The upper face 11 of the arm 9 is inclined upwardly from the extremity of the arm toward the body of the leg as shown in Figs. 3 and 5, for the purpose hereinafter described. At either side of the arm 9 are the undercut lugs 12—12, having undercut faces as at 13—13 adapted to engage the divergent undercut faces 7 of the lugs 6.

In attaching the leg to the tub body, it is essential to solid support that the upper edge 14 of the leg throughout its extent, shall contact snugly with the curvature of the tub body, and the arrangement of the lugs 2 and 6 of the tub body and that of the attaching arm 9 and the under-cut lugs 12 of the leg is determined by this curvature. The slant or inclination of the surface 5 of the face or projection 4 and the inclination or slant of the upper face 11 of the attaching arm 9 are such that when the leg is drawn home to final attached position, the entire area of the surface 5 of the projection 4 will be in solid supporting contact with the opposite portion of the surface 11 of the arm 9.

To this end, the inclination of these surfaces must be determined accurately with relation to the vertical curvature of the side of the tub body. Furthermore, since it is necessary for the most effective and durable clamping and holding action between the faces 7 of the lugs 6 of the tub body, and the undercut faces 13 of the lugs 12 of the legs, that these faces 7 and 13 respectively, be in contact throughout, the inclination of the faces 7 to the tub body and that of the faces 13 to the curved edge of the leg which engages the curvature of the tub body, must be accurately determined with respect to the degree of curvature of the contacting portions of the tub body and leg.

In order that the leg may be drawn accurately to the proper point of support on the tub body, merely by screwing up the nut 15, Fig. 3, or the screws 16 or 17, Figs. 4 and 5 respectively, the faces 7 of the lugs 6 are arranged on divergent lines which meet in a line drawn through the center of the lug 2 and at right angles to the general trend of the side of the tub body, and the engaging faces 13 of the lugs 12 of the leg are arranged on lines diverging at a corresponding angle to that of the lines of the faces 7, so that when the lug is drawn home, the center of the leg will necessarily be drawn accurately to a position opposite the center of the lug 2, and thus to the predetermined point of support with respect to the tub body.

The ultimate result of the arrangement of the parts above described is that the leg will be brought, as it may be said, automatically to proper supporting position, and at the same time, the curvature of the upper portion of the leg will fit accurately and snugly against the curved face of the side of the tub.

While I have herein described a particular construction and arrangement of parts, it is to be understood that the invention is not to be confined to the special construction disclosed, but that the construction and arrangement may be varied within the scope of the appended claim.

What I claim is:

In a bath tub construction, the combination with the bath tub body of a plurality of attaching lugs in triangular arrangement at the curvature at the junction of the side and bottom of the tub, one of said lugs being positioned toward the center of the bottom and having bolt receiving means; a supporting face or projection adjacent the base of said lug, the other two body lugs being arranged at the opposite apices of an isosceles triangle and having undercut faces arranged on divergent lines, which meet in a line passing through the center of said securing lug; of a supporting leg having an arm carrying a bolt adapted to be secured to said securing lug, said arm having a supporting face adapted to bear upon said supporting face, said leg also having undercut auxiliary lugs having faces arranged on divergent lines corresponding to those of the body auxiliary lugs, the upper end of said leg being curved in a manner corresponding to the curvature of the junction of the side wall and bottom of the tub, whereby the operation of securing the attaching lug and attaching arm together, will draw the curved upper end of the leg into snug and accurate fit against the curvature of the tub body and simultaneously will draw and maintain the bearing surfaces of the pad and securing arm respectively and the bearing faces of the auxiliary body and leg lugs respectively, into firm engagement throughout their areas.

In testimony whereof, I the said JAMES H. DANVER have hereunto set my hand.

JAMES H. DANVER.

Witnesses:
CHAS. B. NESBITT,
G. W. BESSOR.

Copies of this patent may be obtained for five cents each, by addressing the "Commissioner of Patents, Washington, D. C."